Patented Apr. 17, 1934

1,955,050

UNITED STATES PATENT OFFICE 1,955,050

PRODUCTION OF MONOCARBOXYLIC ACIDS

Johannes Brode and Adolf Johannsen, Ludwigshafen-on-the-Rhine, Germany, assignors to I. G. Farbenindustrie Aktiengesellschaft, Frankfort-on-the-Main, Germany, a corporation of Germany No Drawing. Application November 19, 1926, Serial No. 149,520. In Germany November 27, 1925

10 Claims. (Cl. 260—108)

It is known that monocarboxylic acids can be obtained by heating calcium salts of dicarboxylic acids; thus, for example, benzoic acid can be obtained by heating calcium phthalate. Monocarboxylic acids can also be obtained by heating salts of dicarboxylic acids under pressure in the absence or presence of water. However, all these processes have to be operated discontinuously and often require expensive apparatus so that working on an industrial scale would be uneconomical or impossible. A further great disadvantage is caused by the fact that only the anhydrides of dicarboxylic acids are readily available initial materials, and that for carrying out the said known processes they must first be converted into salts of the acids.

Now we have found that monocarboxylic acids can be prepared in a simple and continuous process by passing the vapors of dicarboxylic acids or their anhydrides, together with water vapor or gases or gas mixtures containing water vapor, such as moist air, at an elevated temperature over catalysts.

The process according to our present invention can be carried out at temperatures between about 250° and 500° C.; generally speaking the most favorable results are obtained at between about 300° and 450° C.; the most favorable temperature, however, depends also on the nature of the catalyst employed.

All kinds of catalysts which are capable of splitting off carbon dioxid may be employed. For example carbonates which are stable at the temperature of working such as sodium carbonate and calcium carbonate, or oxids, hydroxids or silicates of most various elements, or mixtures of several such substances may be employed. For example the oxids of zinc, cadmium, lead, bismuth, silicon, aluminium, titanium, iron and nickel give very good results. The efficiency of these catalysts may be considerably increased by activating additions, in particular small quantities, of oxids of other metals. Also mixtures of several such catalysts, whether of natural or artificial origin, for example bauxite, may be employed with good results. Metallic catalysts, for example granulated aluminium, are also efficient. Preferably the catalysts are employed in conjunction with suitable supports such as pumice stone, clay or the like.

The reaction is advantageously carried out with an excess of water vapor over the quantity theoretically required; however, the process may also be carried out by exposing the vapor mixture formed by heating dicarboxylic acids (which mixture consists probably of the dicarboxylic acid, its anhydride and water vapor) directly over the catalyst. When starting from dicarboxylic acid anhydrides, an addition of water vapor to the anhydride vapor is necessary.

The operation with a gas or air current containing water vapor often offers advantages over the use of water vapor alone, as, for example in the conversion of phthalic anhydride into benzoic acid, the concentration of the water vapor and the temperature at which the separation of the reaction products takes place, may be so chosen as to obtain the reaction product directly in a solid, practically dry form; this results in the purification and further use of the reaction product being much facilitated.

The dicarboxylic acid anhydrides employed as initial materials in the process above described, for example phthalic anhydride, maleic anhydride and the like, may be obtained by the catalytic oxidation of vapors of hydrocarbons or their derivatives such as naphthalene, naphthol, benzene, phenol and the like. Certain dicarboxylic acid anhydrides, for example succinic anhydride may also be obtained by the hydrogenation of anhydrides of unsaturated dicarboxylic acids such as maleic anhydride.

We have further found that when the dicarboxylic acid anhydrides are prepared by catalytic reactions in the vapor phase, such for example, as have been mentioned before, it is not necessary to separate the anhydride from the reaction mixture, but the latter may be passed directly or after an addition of water vapor has been made, over the catalyst capable of splitting off carbon dioxid. This method of working is of particular advantage when the anhydrides are prepared by the catalytic oxidation of hydrocarbons or derivatives thereof.

It is even possible to subject organic compounds several times to catalytic oxidation and catalytic splitting off of carbon dioxide, without an intermediary separation of the reaction products being necessary. By this manner of working the conversion gradually proceeds further and further. The order of the single operations depends of course on the result to be obtained. The combination of operations most suitably to be employed and the most favorable conditions of working cannot be precisely indicated in a general way, as they depend on the nature of the compounds to be treated and to be obtained, but they can easily be ascertained by some tests.

According to this process, for example acenaphthene may be converted by repeated oxidation and decarbonation, i. e. splitting off carbon dioxid, into formaldehyde with the following products being obtained as intermediary products, viz, naphthalic anhydride, naphthoic acid, naphthalene, phthalic anhydride, benzoic acid, benzene, benzoquinone maleic anhydride, acrylic acid and ethylene. Starting from naphthalene or its substitution products such as alkyl-naphthalenes, hydroxy - naphthalenes, nitro-naphthalenes and the like, in a similar manner phthalic anhydride, benzoic acid, benzene, benzoquinone, maleic anhydride, acrylic acid, ethylene and formaldehyde can be obtained. Salicylic acid can be converted into phenol, benzoquinone, maleic anhydride, acrylic acid, ethylene and formaldehyde. In a similar manner other organic compounds can be stepwise converted into valuable decomposition products. Of course the process may be interrupted at any desired stage after the initial material has undergone at least once both the catalytic oxidation and catalytic decarbonation.

Generally the various treatments are carried out one after the other, as in such case the conditions as to temperature, pressure, concentration of the organic compound in the gas mixture and so forth, can be maintained in the most favorable range. In case the most favorable conditions as regards the temperature, speed of the gas current, rate of dilution, and the like, to be maintained in two or more subsequent stages are about the same, the oxidation and decarbonation may be carried out simultaneously by employing a mixture of the oxidizing catalyst with the catalyst capable of splitting off carbon dioxid. However, this manner of working is in most cases not very advantageous. Thus, for example in the manufacture of benzoic acid from naphthalene with the intermediary production of phthalic anhydride, the resulting benzoic acid is very sensitive to oxidation, while on the other hand the oxidation of naphthalene to phthalic anhydride requires rather strong conditions as regards the catalyst and the temperature; therefore, if in this case the oxidation and decarbonation are carried out simultaneously, a considerable part of the benzoic acid formed is further oxidized, so that the yield is rather low; therefore, in this instance the two stages should not be combined into a single one.

In the process last described care should be taken that in the catalytic decarbonation of a dicarboxylic acid anhydride into a monocarboxylic acid, water vapor is present in sufficient amounts. For the catalytic oxidation materials capable of supplying oxygen, such as carbon dioxide, water vapor and the like may be employed instead of or along with oxygen or oxygen-containing gases such as air. When the initial material is subjected to several oxidations or decarbonations, it is of course not necessary to employ the same catalysts throughout, but each operation may be carried out with the catalyst best suitable for the desired reaction.

The process here described may also be combined with other catalytic reactions such for example as hydrogenation, dehydrogenation, hydration and the like.

The following examples will further illustrate how our invention may be carried out in practice, but the invention is not limited to these examples.

*Example 1*

Superheated steam is blown through fused phthalic anhydride maintained at a temperature ranging from 200° to 250° C. and the gas mixture thus formed is passed through a contact vessel maintained at a temperature of about 400° C. and containing calcium carbonate precipitated on a carrier.

Ample quantities of benzoic acid are obtained. The best yields of benzoic acid are produced by working so that some unchanged phthalic anhydride is still contained in the gas mixture leaving the reaction vessel. The benzoic acid is separated from the phthalic anhydride or acid and some by-products by any known method. By working under conditions not so favorable for the desired purpose, side-reactions may occur, for example the formation of benzophenone or a decomposition of benzoic acid into benzene and carbon dioxid.

*Example 2*

Nitrogen saturated at about 30° C. with water vapor is passed over phthalic acid maintained at a temperature of about 180° to 200° C. The mixture of gases and vapors thus formed is passed over a mixture of bismuth oxid and aluminium oxid precipitated on pumice stone, and maintained at a temperature of about 340° to 360° C. The gas mixture leaving the reaction vessel is cooled whereby dry very pure benzoic acid is separated in a good yield.

*Example 3*

A gas mixture consisting of nitrogen saturated at 45° C. with water vapor and phthalic anhydride vapor is passed at between 330° and 360° C. over a contact mass consisting of iron oxid mixed with activating oxids of other metals. The reaction products are condensed by cooling and a nearly dry product containing more than 90 per cent of benzoic acid is obtained in a good yield. The crude product may be purified by any suitable method.

*Example 4*

A gaseous mixture consisting of nitrogen saturated at 35° to 40° C. with water vapor and maleic anhydride vapor is passed at 400° C. over a contact mass consisting of active silica gel. The gas mixture leaving the reaction vessel is cooled and washed with water. The acrylic acid formed is dissolved in the water together with unchanged maleic anhydride. The acrylic acid can be separated from the maleic acid by distillation.

In a similar manner other dicarboxylic acid anhydrides such as succinic anhydride can be converted into mono-carboxylic acids.

*Example 5*

A mixture of air and naphthalene vapor is passed over a catalyst consisting of vanadium pentoxid maintained at a temperature of 370° C. The reaction mixture leaving the reaction vessel is mixed with nitrogen and water vapor and passed over active silica gel at a temperature of 380° C. The hot mixture is slowly cooled, and the products condensed one after the other at different temperatures are collected separately and worked up to phthalic anhydride or phthalic acid and benzoic acid.

Example 6

A mixture of air and naphthalene vapor is passed at an elevated temperature over a contact mass consisting of vanadium pentoxid, the temperature, the concentration and the time of contact being so controlled that a good yield of phthalic anhydride is obtained, avoiding as far as possible the formation of quinone like substances. The hot gaseous reaction products containing water vapor leaving the oxidation contact are preferably passed at first over a purifying mass having a great surface, for example pumice stone, at a temperature of 360° C. and then over a catalyst containing zinc oxide either in compact particles or on a suitable carrier such as pumice stone. The gas mixture leaving the reaction chamber is cooled whereby simultaneously the mixture of air and naphthalene vapor newly introduced into the process may be partly preheated. Very good yields of benzoic acid are obtained together with small quantities of unchanged phthalic anhydride and traces of by-products of the reaction.

By fractionally separating the reaction products the bulk of the benzoic acid can be obtained directly as a white product of great purity.

Instead of zinc oxid catalysts containing besides zinc oxid activating oxids of other metals may be employed with a still better result. Preferably the catalysts are prepared by spraying a solution of zinc nitrate or of a mixture of zinc nitrate and nitrates of other metals on slightly heated pumice stone and heating the catalyst thus formed to a temperature of 300° to 400° C. in a current of air. Instead of a mixture of air and naphthalene vapor a mixture of naphthalene vapor and oxygen-containing gas of another percentage in oxygen than air may be employed. Such a mixture is used for example when part of the gas mixture remaining after the reaction product is condensed, is reintroduced together with fresh air and naphthalene vapor into the process. Advantageously the carbon dioxid formed in the process is separated from the gas before it is reintroduced.

In the process as above described the oxidation of naphthalene or the conversion of intermediarily formed phthalic anhydride into benzoic acid or both processes may be carried out under elevated pressure. As initial material crude industrial naphthalene may be used.

Example 7

A mixture of air and naphthalene vapor is passed over a contact mass containing vanadium pentoxid at 400° C. and the reaction mixture thus formed containing water vapor is cooled to 380° C. and brought into contact with a catalyst containing the oxids of cadmium and aluminium. The benzene formed may be recovered from the gas mixture leaving the reaction chamber by absorption by means of tar oils of high boiling point or by absorption by means of active charcoal or by any other suitable method.

Instead of the mixture of air and naphthalene vapor a mixture of naphthalene vapor, oxygen and water vapor may be used in the same way. In this case the benzene formed may be condensed together with the water vapor. Instead of naphthalene, methylnaphthalene or other derivatives of naphthalene or mixtures thereof may be employed as initial materials.

Example 8

A mixture of air and naphthalene vapor is passed over a contact mass containing vanadium pentoxid at a temperature of 400° C. The products of the reaction containing water vapor are cooled to 390° C. and passed over a contact mass containing the oxids of zinc, cadmium and aluminium, and then if required after being mixed with preheated air, passed over a catalyst containing salts of vanadic acid at a temperature of 410° C. The maleic anhydride formed may be obtained by cooling in the form of anhydride or by washing with water in form of maleic acid. Benzoquinone is obtained as by-product.

What we claim is:

1. The process of producing benzoic acid which comprises passing phthalic anhydride vapor together with water vapor at between about 250° and 500° C. over a catalyst comprising essentially iron oxid and an oxid of another metal activating the iron oxid.

2. The process of producing benzoic acid which comprises passing phthalic anhydride vapor together with water vapor at between about 330° and 360° C. over a catalyst comprising essentially iron oxid and an oxid of another metal activating the iron oxid.

3. The process of producing monocarboxylic acids, which comprises passing the vapors of a dicarboxylic acid at between about 250° and 500° C. over a catalyst comprising essentially an iron oxide.

4. The process of producing monocarboxylic acids, which comprises passing the vapors of a dicarboxylic acid together with water vapor at between about 250° and 500° C. over a catalyst comprising essentially an iron oxide.

5. The process of producing monocarboxylic acids, which comprises passing the vapors of a dicarboxylic acid anhydride together with water vapor at between about 250° and 500° C. over a catalyst comprising essentially an iron oxide.

6. The process of producing monocarboxylic acids, which comprises passing the vapors of a dicarboxylic acid anhydride together with water vapor at between about 300° and 450° C. over a catalyst comprising essentially an iron oxide.

7. The process of producing benzoic acid, which comprises passing phthalic anhydride vapor together with water vapor at between about 250° and 500° C. over a catalyst comprising essentially an iron oxide.

8. The process of producing benzoic acid, which comprises passing phthalic anhydride vapor together with water vapor over a catalyst consisting of iron oxide and another metal oxide activating the iron oxide at between about 330° and 360° C.

9. The process of producing monocarboxylic acids, which comprises passing the gas mixture resulting from the catalytic manufacture of a dicarboxylic anhydride in the vapor phase at between about 250° and 500° C. over a catalyst comprising essentially an iron oxide.

10. The process of producing benzoic acid, which comprises subjecting naphthalene vapor to a catalytic oxidation to phthalic anhydride and passing the resulting gas mixture at between about 250° and 500° C. over a catalyst comprising essentially an iron oxide.

JOHANNES BRODE.
ADOLF JOHANNSEN.